United States Patent
Fukaya et al.

(10) Patent No.: US 7,654,288 B2
(45) Date of Patent: Feb. 2, 2010

(54) HEAT-RESISTANT RUBBER HOSE FOR DIESEL ENGINE

(75) Inventors: Hideji Fukaya, Nissin (JP); Masashi Noda, Konan (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 0 days.

(21) Appl. No.: 12/059,779

(22) Filed: Mar. 31, 2008

(65) Prior Publication Data

US 2008/0236696 A1 Oct. 2, 2008

(30) Foreign Application Priority Data

Mar. 29, 2007 (JP) .............................. 2007-088936

(51) Int. Cl.
*F16L 11/00* (2006.01)
(52) U.S. Cl. ...................... 138/124; 138/123; 138/137; 138/140; 428/36.91
(58) Field of Classification Search ................. 138/124, 138/123, 137, 140; 428/36.9, 36.91
See application file for complete search history.

(56) References Cited

U.S. PATENT DOCUMENTS

| | | | | |
|---|---|---|---|---|
| 5,119,927 | A * | 6/1992 | Bruggemann | ............... 198/847 |
| 5,378,539 | A * | 1/1995 | Chen | ......................... 428/378 |
| 6,386,239 | B1 * | 5/2002 | Ramey et al. | ............... 138/125 |
| 6,435,217 | B1 * | 8/2002 | Bertero et al. | ............. 138/126 |
| 6,605,327 | B1 * | 8/2003 | Ramey et al. | ............. 428/36.2 |
| 2004/0071911 | A1 * | 4/2004 | Kerstetter et al. | .......... 428/36.9 |
| 2006/0100328 | A1 | 5/2006 | Goossens | |
| 2006/0263556 | A1 | 11/2006 | Beck | |
| 2007/0251593 | A1 * | 11/2007 | Noda et al. | ................. 138/126 |
| 2008/0072984 | A1 * | 3/2008 | Branch et al. | ............... 138/124 |

FOREIGN PATENT DOCUMENTS

| | | |
|---|---|---|
| JP | 5-9378 A | 1/1993 |
| JP | 7-229584 A | 8/1995 |
| JP | 2003-82029 A | 3/2003 |
| JP | 2007-55219 A | 3/2007 |

OTHER PUBLICATIONS

Extended European Search Report dated Jul. 6, 2009, issued in corresponding European Application No. 08006097.

* cited by examiner

*Primary Examiner*—Patrick F Brinson
(74) *Attorney, Agent, or Firm*—Westerman, Hattori, Daniels & Adrian, LLP

(57) ABSTRACT

A heat-resistant rubber hose for a diesel engine is provided, which is excellent in exhaust gas water resistance (acid resistance), heat resistance, flame resistance and low-temperature property. The heat-resistant rubber hose includes a tubular inner layer (1) and an outer layer (2) provided on an outer peripheral surface of the tubular inner layer (1), the inner layer (1) being composed of an inner layer material essentially including the following components (A) and (B) and free from an acid acceptor, the outer layer (2) being composed of an outer layer material essentially including the following components (A) to (C):
(A) an ethylene-vinyl acetate copolymer rubber (EVM);
(B) an organic peroxide crosslinking agent; and
(C) at least one of a metal hydroxide and a surface-treated metal hydroxide.

4 Claims, 1 Drawing Sheet

HEAT-RESISTANT RUBBER HOSE FOR DIESEL ENGINE

BACKGROUND OF THE INVENTION

1. Field of the Invention

The present invention relates to a heat-resistant rubber hose for a diesel engine for use as a diesel particulate filter (DPF) sensor hose, a vacuum brake hose, an air hose, a turbo (supercharger) air hose and the like for a diesel engine.

2. Description of the Related Art

With increasing worldwide environmental awareness, DPF systems and turbo systems have been positively employed for reducing PM (particulate matter) and $NO_x$ in exhaust gas. Conventionally, hoses each configured such that an inner layer thereof to be kept in contact with fuel is formed of a fluororubber or an acrylic rubber are proposed for use as fuel hoses and air hoses (see, for example, JP-A-7 (1995)-229584 and JP-A-2003-82029).

In recent years, emission control for diesel-powered vehicles has been tightened. To cope with this, new engine systems (e.g., common-rail injection systems), and DPF systems and turbo systems for the reduction of PM and $NO_x$ in the exhaust gas have been positively employed. Under such circumstances, stricter performance requirements are imposed on heat-resistant rubber hoses such as DPF sensor hoses for diesel engines. More specifically, where combustion efficiency is increased for the reduction of PM and $NO_x$ in the exhaust gas, the DPF system and the turbo system are subjected to elevated temperatures. Therefore, the heat-resistant rubber hoses are required to be more excellent in heat resistance, acid resistance, flame resistance and low-temperature property than conventional hoses. However, a conventional hose having an inner layer of a fluororubber (FKM) contains an acid acceptor (a metal salt such as magnesium oxide, zinc oxide or calcium oxide) and, therefore, is inferior in resistance to exhaust gas water (acid resistance). A conventional hose having an outer layer of an epichlorohydrin-ethylene oxide copolymer (ECO) is insufficient in heat resistance. Further, a conventional hose having inner and outer layers of an acrylic rubber (ACM) essentially requires a post cure process, so that the outer layer thereof has poorer flame resistance.

In view of the foregoing, it is an object of the present invention to provide a heat-resistant rubber hose for a diesel engine, which is excellent in exhaust gas water resistance (acid resistance), heat resistance, flame resistance and low-temperature property.

SUMMARY OF THE INVENTION

In accordance with the present invention to achieve the aforementioned object, there is provided a heat-resistant rubber hose for a diesel engine, which comprises a tubular inner layer and an outer layer provided on an outer peripheral surface of the tubular inner layer, wherein the inner layer is composed of an inner layer material essentially comprising the following components (A) and (B) and free from an acid acceptor, and the outer layer is composed of an outer layer material essentially comprising the following components (A) to (C):

(A) an ethylene-vinyl acetate copolymer rubber (EVM);
(B) an organic peroxide crosslinking agent; and
(C) at least one of a metal hydroxide and a surface-treated metal hydroxide.

In order to provide a heat-resistant rubber hose for a diesel engine which is excellent in exhaust gas water resistance (acid resistance), heat resistance, flame resistance and low-temperature property, the inventors of the present invention conducted intensive studies centered on materials for respective layers of the rubber hose. As a result, the inventors found that the aforementioned object is achieved by employing an EVM (ethylene-vinyl acetate copolymer rubber) vulcanizable with a peroxide without the need for post cure and excellent in heat resistance, acid resistance, flame resistance and low-temperature property for inner and outer layer materials, blending no acid acceptor (i.e., none of metal salts such as magnesium oxide, zinc oxide and calcium oxide) in the inner layer material, and blending a predetermined amount of a metal hydroxide and/or a surface-treated metal hydroxide in the outer layer material. Thus, the inventors attained the present invention.

With the aforementioned arrangement, the inventive heat-resistant rubber hose for the diesel engine is imparted with the aforementioned excellent properties by the peroxide-vulcanizable EVM, and further imparted with desired heat resistance and flame resistance by blending a predetermined amount of the metal hydroxide and/or the surface-treated metal hydroxide in the outer layer material. Since no acid acceptor is blended in the inner layer material, the rubber hose is free from cracking and other inconveniences which may otherwise occur when the acid acceptor is dissolved in exhaust gas water (condensed acidic water).

According to the present invention, the EVM (ethylene-vinyl acetate copolymer rubber) vulcanizable with the peroxide without the need for the post cure and excellent in heat resistance, acid resistance, flame resistance and low-temperature property is employed for the inner and outer layer materials for the heat-resistant rubber hose for the diesel engine. Further, the inner layer material is free from the acid acceptor, and the outer layer material contains a predetermined amount of the metal hydroxide and/or the surface-treated metal hydroxide. Therefore, the rubber hose is excellent in exhaust gas water resistance (acid resistance), heat resistance and flame resistance. Since no acid acceptor such as a metal oxide is blended in the inner layer material, the rubber hose is free from cracking and other inconveniences which may otherwise occur when the acid acceptor is dissolved in the exhaust gas water (condensed acidic water). Therefore, the inventive heat-resistant rubber hose is advantageously employed as a DPF sensor hose, a diesel vacuum brake hose, a diesel air hose, a turbo diesel air hose or the like.

Where the outer layer material further contains zinc borate or red phosphorus, the outer layer is imparted with more excellent flame resistance.

DETAILED DESCRIPTION OF PREFERRED EMBODIMENTS

With reference to the attached drawings, the present invention will hereinafter be described in detail by way of embodiments thereof. However, the invention is not limited to these embodiments.

Figure 1:
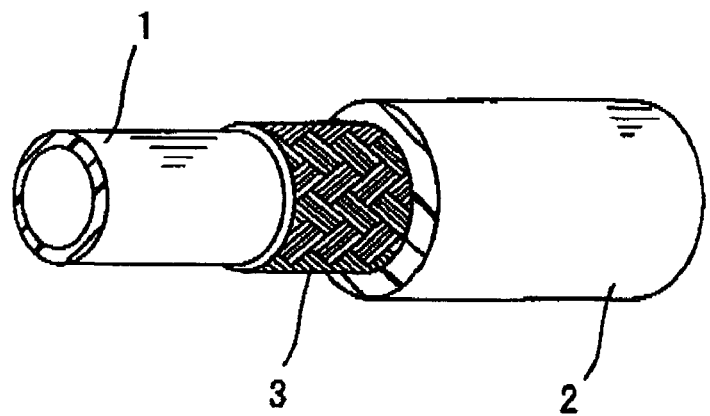
FIG. 1 is a schematic diagram illustrating an exemplary heat-resistant rubber hose for a diesel engine according to the present invention.

An inventive heat-resistant rubber hose for a diesel engine includes, for example, a tubular inner layer 1, a fiber reinforcement layer 3 provided on an outer peripheral surface of the tubular inner layer 1, and an outer layer 2 provided on an outer peripheral surface of the reinforcing yarn layer 3 as shown in FIG. 1.

A major feature of the present invention is that the inner layer 1 is composed of an inner layer material which essentially contains an ethylene-vinyl acetate copolymer rubber (EVM, Component (A)) and an organic peroxide crosslinking agent (Component (B)) and is free from an acid acceptor, and the outer layer 2 is composed of an outer layer material which essentially contains an ethylene-vinyl acetate copolymer rubber (EVM, Component (A)), an organic peroxide crosslinking agent (Component (B)) and at least one of a metal hydroxide and a surface-treated metal hydroxide (Component (C)).

The ethylene-vinyl acetate copolymer rubber (Component (A)) is preferably an elastomeric copolymer (hereinafter referred to simply as "EVM") containing vinyl acetate in a proportion of 45 to 75% by weight, particularly preferably 60 to 70% by weight. If the proportion of vinyl acetate is less than 45% by weight, the resulting polymer has a lower viscosity and, therefore, is inferior in mixing processability by roll. On the other hand, if the proportion of vinyl acetate is greater than 75% by weight, the polymer is inferior in low-temperature property.

A preferred example of a commercially available product of the EVM (Component (A)) is LEVAPREN 700HV available from Lanxess K.K.

The organic peroxide crosslinking agent (Component (B)) is employed as a vulcanizing agent for the EVM (Component (A)). The organic peroxide crosslinking agent is not particularly limited, but examples thereof include 2,4-dichlorobenzoyl peroxide, benzoyl peroxide, 1,1-di-t-butylperoxy-3,3,5-trimethylcyclohexane, 2,5-dimethyl-2,5-dibenzoylperoxyhexane, n-butyl-4,4'-di-t-butylperoxyvalerate, dicumyl peroxide, t-butylperoxybenzoate, di-t-butylperoxy-diisopropylbenzene, t-butyl cumyl peroxide, 2,5-dimethyl-2,5-di-t-butylperoxyhexane, di-t-butyl peroxide and 2,5-dimethyl-2,5-di-t-butylperoxyhexyne-3, which may be used either alone or in combination of two or more thereof. Among these organic peroxide crosslinking agents, di-t-butylperoxy-diisopropylbenzene is preferably used because it is odor-free during crosslinking.

The amount of the organic peroxide crosslinking agent (Component (B)) to be blended is preferably 2 to 8 parts by weight (hereinafter referred to simply as "parts") based on 100 parts of the EVM (Component (A). If the amount of the organic peroxide crosslinking agent is less than two parts, the resulting hose tends to have lower strength because of insufficient crosslinking. On the other hand, if the amount of the organic peroxide crosslinking agent is greater than 8 parts, the resulting hose tends to have poorer flexibility with higher hardness.

In order to increase crosslinking efficiency to improve physical properties, a co-crosslinking agent may be used in combination with the peroxide crosslinking agent for the inner layer material for formation of the inner layer 1 and for the outer layer material for formation of the outer layer 2. Examples of the co-crosslinking agent include a sulfur-containing compound, a multifunctional monomer, a maleimide compound and a quinone compound.

Examples of the sulfur-containing compound include sulfur, dipentamethylene thiuram tetrasulfide and mercaptobenzothiazole. Examples of the multifunctional monomer include divinylbenzene, ethylene glycol dimethacrylate, diallyl phthalate, trimethylolpropane trimethacrylate, triallyl cyanurate, triallyl isocyanurate (TAIC), triallyl trimellitate and triallyl tricyanurate. Examples of the maleimide compound include N,N'-m-phenylene bismaleimide and toluoylene bismaleimide. Examples of the quinone compound include quinone dioxime and dibenzoyl-p-quinone dioxime. Among these co-crosslinking agents, triallyl isocyanuate (TAIC) is preferably used because it forms a crosslinked structure superior in acid resistance.

For the inner layer material and the outer layer material, a vulcanizing agent, a lubricant such as stearic acid, carbon black, an anti-aging agent, an inorganic filler, a colorant, a processing aid and a plasticizer may be employed as required in addition to the EVA (Component (A)) and the organic peroxide crosslinking agent (Component (B)).

In the present invention, the inner layer material should be free from an acid acceptor. This is because, if the acid acceptor (e.g., a metal salt such as magnesium oxide, zinc oxide or calcium oxide) is present in the inner layer material, the acid acceptor is liable to be dissolved in exhaust gas water (condensed acidic water) to cause cracking.

In the present invention, the outer layer material should contain at least one of a metal hydroxide and a surface-treated metal hydroxide (Component (C)). Thus, the inventive heat-resistant rubber hose for the diesel engine is imparted with desired heat resistance and flame resistance.

Examples of the metal hydroxide include aluminum hydroxide and calcium hydroxide. Examples of the surface-treated metal hydroxide include metal hydroxides such as aluminum hydroxide surface-treated with stearic acid or a silane coupling agent. These metal hydroxides may be used either alone or in combination. Among these metal hydroxides, aluminum hydroxide is preferably used because it imparts the heat-resistant rubber hose with particularly excellent flame resistance. If aluminum hydroxide is present at a high concentration in the outer layer material, the processability is liable to be deteriorated. However, this problem is eliminated by employing an unsaturated fatty acid ester in combination with aluminum hydroxide.

The component (C) (at least one of the metal hydroxide and the surface-treated metal hydroxide) is preferably present in the outer layer material in a proportion of 50 to 80 parts based on 100 parts of the EVM (Component (A)). If the proportion of Component (C) is less than 50 parts, the resulting outer layer tends to have poorer flame resistance. On the other hand, if the proportion of Component (C) is greater than 80 parts, the resulting outer layer tends to be poorer in normal physical property, heat resistance and/or low-temperature property.

In order to improve the flame resistance of the outer layer 2, a metal oxide, a phosphorus-containing flame retardant, a nitrogen-containing flame retardant, zinc borate, expanded graphite, ammonium phosphate and the like may be blended either alone or in combination, as required, in the outer layer material. Among these flame retardants, zinc borate or red phosphorus is preferably used because of its high flame resistance.

The inventive heat-resistant rubber hose for the diesel engine is produced, for example, in the following manner. The ingredients of the inner layer material are blended in predetermined amounts, and the resulting mixture is mixed by a kneader. Thus, the inner layer material is prepared. In the same manner, the outer layer material is prepared. In turn, the inner layer material and the outer layer material are co-extruded by means of an extruder, and then thermally crosslinked under predetermined conditions (e.g., at 160° C. to 190° C. for 10 to 60 minutes). Thus, a heat-resistant rubber hose having a double-layer structure is produced. The inner and outer layers are not necessarily required to be formed by the co-extrusion. However, the co-extrusion is advantageous in that the inner and outer layers are firmly bonded to each other at an interface thereof to be combined together without the use of an adhesive. In the heat resistant rubber hose for the diesel engine shown in FIG. 1, the reinforcing yarn layer 3 is interposed between the inner layer 1 and the outer layer 2. For production of the hose shown in FIG. 1, the inner layer material and the outer layer material are prepared in the aforesaid manner. The inner layer material is extruded in a tubular form, and then an adhesive is applied on an outer peripheral surface of the tubular inner layer as required. In turn, reinforcing yarn (such as of polyester, vinylon, aramide or nylon) are spirally wound around the tubular inner layer, or are braided or knitted to be fitted around the tubular inner layer. Thus, the reinforcing yarn layer 3 is formed. Then, an adhesive is applied on an outer peripheral surface of the reinforcing yarn layer 3 as required, and the outer layer material is extruded around the reinforcing yarn layer 3. Thereafter, the inner and outer layers are thermally crosslinked in the aforesaid manner. Thus, the heat resistant rubber hose shown in FIG. 1 is produced.

The provision of the reinforcing yarn layer 3 between the inner layer 1 and the outer layer 2 in the hose shown in FIG. 1 further improves the durability of the hose. Therefore, the hose exhibits excellent performance even if the hose is used as a high-pressure hose.

The inventive heat-resistant rubber hose for the diesel engine may be formed, for example, into a straight shape by a vacuum sizing method, or into a bellows shape by a corrugator.

In the inventive heat-resistant rubber hose for the diesel engine, the inner layer 1 typically has a thickness of 0.05 to 3 mm, preferably 0.1 to 2 mm, and the outer layer 2 typically has a thickness of 0.05 to 3 mm, preferably 0.1 to 2 mm. The inventive heat-resistant rubber hose typically has an inner diameter of 2 to 30 mm, preferably 5 to 25 mm.

Next, examples of the present invention will be described in conjunction with comparative examples. However, the invention is not limited to these examples.

Prior to production of rubber hoses of the inventive examples and the comparative examples, the following ingredients were prepared.

EVM (Component (A))
An ethylene-vinyl acetate copolymer rubber having a vinyl acetate content of 70% by weight (LEVAPRENE 700HV available from Lanxess K.K.)

PO-ACM
A methyl acrylate-ethyl acrylate copolymer

PO-AEM
An ethylene-methyl acrylate copolymer (VAMAC-DP available from E. I. Du Pont de Nemours and Company)

AEM
A terpolymer of an ethylene-methylacrylate copolymer and a monomer having a vulcanizable site (VAMAC-G available from E. I. Du Pont de Nemours and Company)

Stearic Acid
LUNAC S30 available from Kao Corporation

Carbon Black
MAF (Medium Abrasion Furnace) carbon black (SHOBLACK MAF available from Cabot Japan K.K.)

Processing Aid
RIKESTER SL-02 available from Riken Vitamin Co., Ltd.)

Plasticizer
ADEKACIZER RS-735 available from Adeka Corporation

Co-Crosslinking Agent
Triallyl isocyanurate (TAIC-M60 available from Nippon Kasei Chemical Co., Ltd.)

Organic Peroxide Crosslinking Agent (Component (B))
Di-t-butylperoxy-diisopropylbenzene (PEROXYMON F-40 available from NOF Co., Ltd.)

Crosslinking Accelerator
Di-o-tolylguanidine (NOCCELER DT available from Ouchi Shinko Chemical Industrial Co., Ltd.)

Vulcanizing Agent
Hexamethylenediamine carbamate (DIAK #1 available from E. I. Du Pont de Nemours and Company)

Aluminum hydroxide (Component (C))
HIGILITE H42M available from Showa Denko K.K.

Surface-Treated Aluminum Hydroxide (Component (C))
HIGILITE H42S available from Showa Denko K.K.

Zinc Borate
ALKANEX FRC-150 available from Sanyo Trading Co., Ltd.

Red Phosphorus
NOVARED 120UF available from Rinkagaku Kogyo Co., Ltd.

Next, inner and outer layer materials were prepared by employing these ingredients.

(1) Preparation of Inner Layer Materials
Inner layer materials a to d were each prepared by blending ingredients in amounts shown in Table 1 and mixing the resulting mixture.

(2) Preparation of Outer Layer Materials
Outer layer materials A to I were each prepared by blending ingredients in amounts shown in Table 2 and mixing the resulting mixture.

The inner layer materials (unvulcanized blends) thus prepared were each press-vulcanized at 160° C. for 45 minutes. Then, vulcanized rubber test pieces each having a shape and a size specified by a JIS test method to be described later were prepared from the vulcanized inner layer materials. The vulcanized rubber test pieces of the inner layer materials were evaluated for characteristic properties based on the following criteria. The results of the evaluation are shown in Table 1.

The outer layer materials (unvulcanized blends) were each steam-vulcanized at 160° C. for 35 minutes. Then, vulcanized rubber test pieces each having a shape and a size specified by the JIS test method to be described later were prepared from the vulcanized outer layer materials. The vulcanized rubber test pieces of the outer layer materials were evaluated for characteristic properties based on the following criteria. The results of the evaluation are shown in Table 2.

Normal Physical Property
A vulcanized rubber test piece having a shape and a size specified by JIS K6251 was prepared from each of the inner and outer layer materials, and the tensile strength (Ts) and the elongation at break (Eb) of the vulcanized rubber test piece were measured in conformity with JIS K6251. For evaluation, a test piece having a TS of not less than 8 MPa and an Eb of not less than 200% was rated as excellent (o), and a test piece failing to satisfy at least one of these criteria was rated as unacceptable (x).

Heat Resistance (Compression Set)
A vulcanized rubber test piece having a shape and a size specified by JIS K6262 was prepared from each or the inner and outer layer materials. For evaluation of the heat resistance of the test piece, a high-temperature compression set was measured at a temperature of 175° C. for a test period of 72 hours in conformity with JIS K6262. A test piece having a compression set of not greater than 75% was rated as excellent (o), and a test piece having a compression set of greater than 75% was rated as unacceptable (x).

Low-Temperature Property

A vulcanized rubber test piece having a shape and a size specified by JIS K6404 was prepared from each of the inner and outer layer materials. The vulcanized rubber test piece was evaluated for low-temperature property in conformity with JIS K6404. For the evaluation, a test piece having a breakage temperature of higher than −30° C. was rated as unacceptable (x), and a test piece having a breakage temperature of not higher than −30° C. was rated as excellent (o).

Flame Resistance

Figure 2:
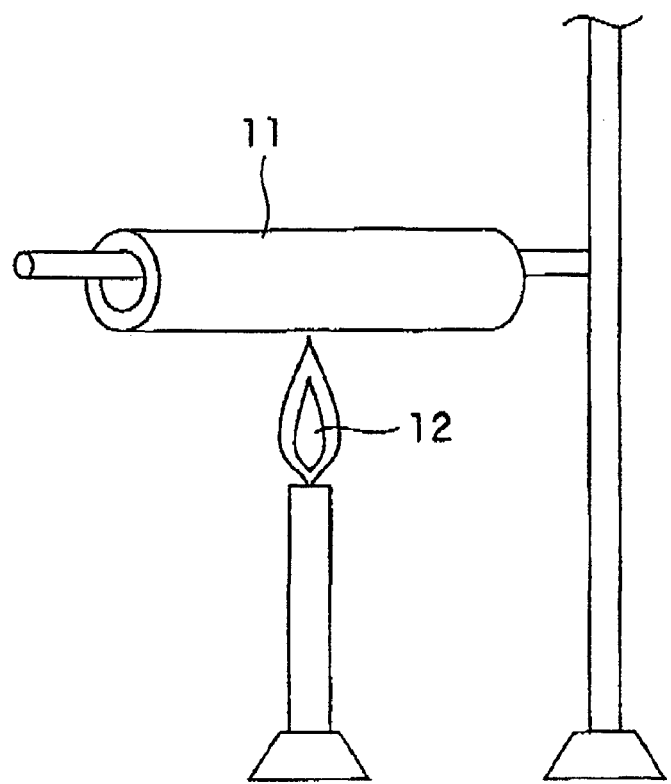
FIG. 2 is a diagram for explaining a method for evaluating flame resistance.

The outer layer materials (unvulcanized blends) were each molded into a hose 11 having a diameter of 13 mm as shown in FIG. 2. Then, a flame 12 was applied to a middle portion of the hose 11 to fire the hose 11, and removed after a lapse of 30 seconds. The time (extinction period) required for extinction of the fire of the hose after the removal of the flame was measured. For evaluation, a hose having an extinction period not longer than 5 seconds was rated as excellent (o), and a hose having an extinction period longer than 5 seconds was rated as unacceptable (x).

TABLE 1

|  | Inner layer material (parts by weight) | | | |
| --- | --- | --- | --- | --- |
|  | a | b | c | d |
| EVM | — | — | — | 100 |
| PO-ACM | 100 | — | — | — |
| PO-AEM | — | 100 | — | — |
| AEM | — | — | 100 | — |
| Stearic acid | 1 | 1 | 1 | 1 |
| Carbon black | 50 | 50 | 50 | 50 |
| Processing aid | 2 | 2 | 2 | 2 |
| Plasticizer | 15 | 15 | 15 | 15 |
| Co-crosslinking agent | 2 | 2 | — | 2 |
| Organic peroxide crosslinking agent | 5 | 5 | — | 5 |
| Crosslinking accelerator | — | — | 4 | — |
| Vulcanizing agent | — | — | 1.5 | — |
| Normal physical property | | | | |
| TS (MPa) | 9.2 | 10.2 | 8.9 | 8.7 |
| Eb (%) | 380 | 360 | 250 | 380 |
| Evaluation | o | o | o | o |
| Heat resistance (Compression set) | | | | |
| Measurement (%) | 85 | 80 | 80 | 41 |
| Evaluation | x | x | x | o |
| Low-temperature property | | | | |
| Measurement (° C.) | −30 | −35 | −35 | −30 |
| Evaluation | o | o | o | o |

TABLE 2

|  | Outer layer material (parts by weight) | | | | | | | | |
| --- | --- | --- | --- | --- | --- | --- | --- | --- | --- |
|  | A | B | C | D | E | F | G | H | I |
| EVM | — | — | — | 100 | 100 | 100 | 100 | 100 | 100 |
| PO-ACM | 100 | — | — | — | — | — | — | — | — |
| PO-AEM | — | 100 | — | — | — | — | — | — | — |
| AEM | — | — | 100 | — | — | — | — | — | — |
| Stearic acid | 1 | 1 | 1 | 1 | 1 | 1 | 1 | 1 | 1 |
| Carbon black | 60 | 60 | 60 | 60 | 60 | 60 | 70 | 60 | 60 |
| Aluminum hydroxide | 50 | 50 | 50 | 50 | 80 | — | — | 50 | 50 |
| Surface-treated aluminum hydroxide | — | — | — | — | — | 80 | — | — | — |
| Zinc borate | — | — | — | — | — | — | — | 10 | — |
| Red phosphorus | — | — | — | — | — | — | — | — | 10 |
| Processing aid | 2 | 2 | 2 | 2 | 2 | 2 | 2 | 2 | 2 |
| Plasticizer | 15 | 15 | 15 | 15 | 15 | 15 | 15 | 15 | 15 |
| Co-crosslinking agent | 2 | 2 | — | 2 | 2 | 2 | 2 | 2 | 2 |
| Organic peroxide crosslinking agent | 5 | 5 | — | 5 | 5 | 5 | 5 | 5 | 5 |
| Crosslinking accelerator | — | — | 4 | — | — | — | — | — | — |
| Vulcanizing agent | — | — | 1.5 | — | — | — | — | — | — |
| Normal physical property | | | | | | | | | |
| TS (MPa) | 6.8 | 7.8 | 7.5 | 10.0 | 9.0 | 9.1 | 10.0 | 8.5 | 8.7 |
| Eb (%) | 210 | 230 | 220 | 350 | 300 | 300 | 380 | 270 | 290 |
| Evaluation | x | x | x | o | o | o | o | o | o |
| Heat resistance (Compression set) | | | | | | | | | |
| Measurement (%) | 90 | 80 | 80 | 70 | 73 | 73 | 73 | 71 | 70 |
| Evaluation | x | x | x | o | o | o | o | o | o |
| Low-temperature property | | | | | | | | | |
| Measurement (° C.) | −27 | −28 | −28 | −32 | −30 | −30 | −30 | −30 | −30 |
| Evaluation | x | x | x | o | o | o | o | o | o |
| Flame resistance | | | | | | | | | |
| Extinction period (s) | 3-4 | 3-4 | 3-4 | 3-4 | 2-4 | 2-4 | 30< | 1-2 | 1-2 |
| Evaluation | o | o | o | o | o | o | x | o | o |

As can be understood from the results shown in Table 1, the inner layer material d was excellent in normal physical property, heat resistant (compression set) and low-temperature property. On the other hand, the inner layer materials a to c were inferior in compression set.

As can be understood from the results shown in Table 2, the outer layer materials D to F, H and I were excellent in normal physical property, heat resistance (compression set), low-temperature property and flame resistance. On the other hand, the outer layer materials A to C were poorer in normal physical property and compression set, requiring post cure. The outer layer materials A to C were also inferior in low-temperature property. The outer layer material G was inferior in flame resistance.

EXAMPLES 1 TO 5 AND COMPARATIVE EXAMPLES 1 TO 5

Hoses were produced by employing the inner layer materials a to d and the outer layer materials A to I in different combinations as shown in Table 3. More specifically, the inner and outer layer materials were prepared in the aforesaid manner, then co-extruded by means of an extruder, and thermally crosslinked by steam at 160° C. for 35 minutes. Thus, hoses of double layer structure were produced, each having an inner diameter of 5 mm and including a 1.5 mm thick inner layer and a 1.5 mm thick outer layer.

The hoses of Examples 1 to 5 and Comparative Examples 1 to 5 were evaluated for various characteristic properties based on the following criteria. The results of the evaluation are shown in Table 3.

Acid Resistance

The hoses were each evaluated for acid resistance by filling a test solution in the hose and allowing the resulting hose to stand at 90° C. for 500 hours. Used as the test solution was an aqueous solution containing formic acid and acetic acid each at concentrations of 300 ppm by volume. Thereafter, the hoses subjected to the filling test were bent. For the evaluation, a hose free from cracking in an inner surface thereof was rated as excellent (o), and a hose suffering from cracking was rated as unacceptable (x).

Flame Resistance

As shown in FIG. 2, a flame 12 was applied to a middle portion of each of the hoses 11 to fire the hose 11, and removed after a lapse of 30 seconds. The time (extinction period) required for extinction of the fire of the hose after the removal of the flame was measured. For evaluation, a hose having an extinction period not longer than 5 seconds was rated as excellent (o), and a hose having an extinction period longer than 5 seconds was rated as unacceptable (x).

Low-Temperature Property

The hoses were each bent in a −35° C. atmosphere. A hose free from cracking in an inner surface thereof was rated as excellent (o), and a hose suffering from cracking was rated as unacceptable (x).

Heat Resistance (Sealability)

For evaluation of heat resistance, the hoses were each evaluated for sealability by filling a test solution in the hose and allowing the resulting hose to stand at 90° C. for 500 hours. Used as the test solution was an aqueous solution containing formic acid and acetic acid each at concentrations of 300 ppm by volume. Thereafter, an end portion of the hose subjected to the filling aging test was connected to a fastening pipe having an outer diameter of 5.3 mm, and fixed to the fastening pipe by means of a fastening jig by applying a fastening torque of 1 N/m to the fastening jig by a screw clamp. Then, the hose was pressurized by water at 0.5 MPa at a room temperature (25° C.). For the evaluation, a hose free from leak of the solution from a fixed portion thereof was rated as excellent (o), and a hose suffering from the leak of the solution was rated as unacceptable (x).

Overall Evaluation

The hoses were each totally evaluated based on the results of the evaluation of the inner layer material, the results of the evaluation of the outer layer material and the results of the evaluation of the hose. For the overall evaluation, a hose having no unacceptable evaluation item was rated as excellent (o), and a hose having at least one unacceptable evaluation item was rated as unacceptable (x).

TABLE 3

|  | Example | | | | | Comparative Example | | | | |
| --- | --- | --- | --- | --- | --- | --- | --- | --- | --- | --- |
|  | 1 | 2 | 3 | 4 | 5 | 1 | 2 | 3 | 4 | 5 |
| Inner layer material | d | d | d | d | d | a | d | d | b | C |
| Outer layer material | D | E | F | H | I | D | A | G | B | C |
| Acid resistance | o | o | o | o | o | o | x | o | x | x |
| Flame resistance | o | o | o | o | o | o | o | x | o | o |
| Low-temperature property | o | o | o | o | o | o | x | o | x | x |
| Heat resistant (Sealability) | o | o | o | o | o | x | x | o | x | x |
| Overall evaluation | o | o | o | o | o | x | x | x | x | x |

As can be understood from the results shown in Table 3, the hoses of Examples were excellent in overall evaluation. On the other hand, the hoses of Comparative Examples were unacceptable in overall evaluation since at least one of the evaluation items was unacceptable.

The inventive heat-resistant rubber hose for the diesel engine can be employed as a DPF sensor hose, a diesel vacuum brake hose, a diesel air hose, a turbo diesel air hose and the like.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. A heat-resistant rubber hose for a diesel engine, comprising:

a tubular inner layer; and an outer layer provided on an outer peripheral surface of the tubular inner layer, wherein the inner layer is composed of an inner layer material essentially comprising the following components (A) and (B) and free from an acid acceptor, and the outer layer is composed of an outer layer material essentially comprising the following components (A) to (C), the component (C) being present in the outer layer material in a proportion of 50 to 80 parts by weight based on 100 parts by weight of the component (A):

(A) an ethylene-vinyl acetate copolymer rubber (EVM);

(B) an organic peroxide crosslinking agent; and (C) at least one of a metal hydroxide and a surface-treated metal hydroxide.

2. The heat-resistant rubber hose as set forth in claim 1, wherein the outer layer material further comprises zinc borate.

3. The heat-resistant rubber hose as set forth in claim 1, wherein the outer layer material further comprises red phosphorus.

4. The heat-resistant rubber hose as set forth in claim 1, further comprising a fiber reinforcement layer provided between the inner layer and the outer layer.

* * * * *